United States Patent
Wang et al.

(10) Patent No.: US 6,526,390 B1
(45) Date of Patent: Feb. 25, 2003

(54) INDEPENDENT BILLING SETTLEMENT FOR CALL ORIGINATION BY WIRELESS SUBSCRIBERS ROAMING TO FOREIGN WIRELESS NETWORKS

(75) Inventors: Jin Wang, Lisle, IL (US); Patuardhana Babu Gorrepati, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/398,591

(22) Filed: Sep. 17, 1999

(51) Int. Cl.[7] ............................................. G06F 17/60
(52) U.S. Cl. .......................................... 705/39; 455/406
(58) Field of Search ............................. 705/39, 40, 41; 455/406, 407, 408, 409, 411, 414, 432, 433, 558; 379/114, 144

(56) References Cited

U.S. PATENT DOCUMENTS

| | | | | |
|---|---|---|---|---|
| 5,557,664 A | * | 9/1996 | Burns et al. | 379/114 |
| 5,915,226 A | * | 6/1999 | Martineau | 455/558 |
| 6,122,355 A | * | 9/2000 | Strohl | 379/144 |
| 6,198,915 B1 | * | 3/2001 | McGregor et al. | 455/406 |

FOREIGN PATENT DOCUMENTS

| | | | | |
|---|---|---|---|---|
| EP | 0780802 | * | 12/1996 | G07B/15/00 |
| EP | 0858186 | * | 8/1998 | H04L/9/32 |

OTHER PUBLICATIONS

"An efficient key exchange protocol for cryptographically secure CDMA systems" S.J. Shepherd et al., Telecommunications Research Group, University of Bradford, Bradford, BD7 1DP, UK.*

"UMTS Universal Mobile Telecommunications System", Sep. 1998 IEEE. 0–7803–4984.*

"Simple authenticated key agreement algorithm", Electronics Letters 06,24,1999 vol. 35, No. 13.*

"Batch Diffie–Hellman key agreement systems and their application to portable communications", Beller, Yacobi; IEEE, Publisher: Springer–Verlag; Workshop on the THeory and Applications of cryptographyic Technique. p208–20.*

Diffie, W. and Hellman, M., "New Directions in Cryptography," *IEEE Transactions on Information Theory*, vol. IT–22, Nov. 1976, pp. 644–654.

Perkins, "IP Mobility Support", Network Working Group, RFC 2002, Oct. 1996.

Droms, "Dynamic Host configuration Protocol", Network Working Group, RFC 2131, Mar. 1997.

"A Primer of the H.323 Series Standard", DataBeam Corporation, May 15, 1998.

"Packet–Based Multimedia Communications Systems" *Series H: Audiovisual and Multimedia Systems—Infrastructure of audiovisual services—Systems and terminal equipment for audiovisual services*, International Telecommunications Union, ITU–T Recommendation H.323 (2/98).

* cited by examiner

Primary Examiner—Vincent Millin
Assistant Examiner—Jeffrey Pwu
(74) Attorney, Agent, or Firm—Sitrick & Sitrick

(57) ABSTRACT

Method and system to bypass GSM Memorandum of Understandings for cellular/PCS services so that GSM subscribers roaming into CDMA or TDMA networks, and CDMA or TDMA subscribers roaming into GSM networks, can be provided with basic call origination wireless services as long as the roamers can pay the bill with their valid credit card. This is achieved by integrating the proper pieces of wireless and wireline networks and secure communications.

14 Claims, 2 Drawing Sheets

INDEPENDENT BILLING SETTLEMENT FOR CALL ORIGINATION BY WIRELESS SUBSCRIBERS ROAMING TO FOREIGN WIRELESS NETWORKS

RELATED APPLICATIONS

Not Applicable.

FEDERALLY SPONSORED RESEARCH OR DEVELOPMENT

Not Applicable.

BACKGROUND OF THE INVENTION

The present invention relates to basic wireless call origination services provided by cellular/PCS operators. Call origination service permits a wireless subscriber to place phone calls either in a home network (e.g., London) or while away from the home network (e.g., in Chicago).

Global Systems for Mobile Communications (GSM) is one widely popular Time Division Multiple Access (TDMA)-based standard used in Europe, China, parts of the United States, and other parts of the world. TDMA is a digital wireless technology.

A GSM subscriber who roams to Code Division Multiple Access (CDMA) wireless networks or other Time Division Multiple Access (TDMA) networks may be denied wireless services even if the subscriber's mobile device is capable of dual-mode (TDMA, CDMA, or analog, and GSM) operation, and the subscriber has the ability to pay for wireless calls with his/her valid credit card. The basis for the denial of service is simply because there does not exist a GSM Memorandum of Understandings (MoU) between the home GSM network and visited CDMA network for billing settlement. Similarly, a CDMA home GSM network and visited CDMA network for billing settlement. Similarly, a CDMA or TDMA subscriber who roams to GSM wireless networks may be denied wireless services even if that subscriber's mobile device is also capable of dual-mode operation, where again the basis for the denial of service is simply because there does not exist a GSM Memorandum of Understandings (MoU) between the home CDMA or TDMA network and visited GSM network for billing settlement.

FIELD OF THE INVENTION

The present invention relates to the field of providing mobile cellular or wireless telephone service for users roaming outside their own predefined service area. The present invention also relates to the field of interoperability of CDMA, TDMA, and GSM cellular and wireless networks.

DESCRIPTION OF RELATED ART

A GSM MoU is an agreement between a consortium of GSM wireless service providers. For example, a subscriber of a first GSM service provider may roam to a service area controlled by a second GSM service provider. An established MoU allows the first GSM service provider to still serve the subscriber while that subscriber is in the service area corresponding to the second GSM service provider. In practice, the second GSM service provider gets paid a portion of the service/roaming charge the first GSM service provider charges the subscriber, which is one reason wireless "roaming charges" are so expensive.

The Local Number Portability (LNP) feature could be used, to some extent, to bypass GSM MoU. LNP allows a telephone subscriber to "port" his/her phone number when that subscriber relocates to a different region of the country, even when the local area code may be different (e.g., a subscriber may reallocate from Chicago to New York, but still keep the original phone number used in Chicago that has an area code of 312).

However, LNP updates are not dynamic by design and thus can have serious limitations. A subscriber who wants LNP typically will request that service by filling out a form. The phone company's administrative staff will manually process the form and make necessary updates of various databases to effect the requested LNP. Note that LNP is designed to support occasional change of location/relocation, and is typically done manually, thus there is a scalability issue in practice.

Public Switched Telephony Network (PSTN) refers to the public phone networks as we know them. PSTN is composed of switches and T1/E1 trunks, central office, etc. PSTN uses circuit-switched technology, in which necessary resources are allocated (dedicated) for the duration of a phone call.

The Diffie-Hellman algorithm is a math method allowing two parties to establish a temporary secret for secure transmission of information. This technique is detailed in: Diffie, W. and Hellman, M., "New directions in cryptography," *IEEE Transactions on Information Theory*, Vol. IT-22, November 1976, pp. 644–654.

BRIEF SUMMARY OF THE INVENTION

The present invention provides a way to bypass GSM MoU so that a GSM user, having the ability to pay wireless calls with his/her credit card, can be provided with basic call origination wireless services while roaming into CDMA and TDMA networks. The present invention additionally provides a way to bypass GSM MoU so that a CDMA or TDMA user, having the ability to pay wireless calls with his/her credit card, can be provided with basic call origination wireless services while roaming into GSM networks. The present invention addresses the above issues of denial of service by combining and integrating the proper pieces of circuit networks and that of wireless and wireline.

These and other aspects and attributes of the present invention will be discussed with reference to the following drawings and accompanying specification.

DETAILED DESCRIPTION OF THE PREFERRED EMBODIMENT

Figure 1:
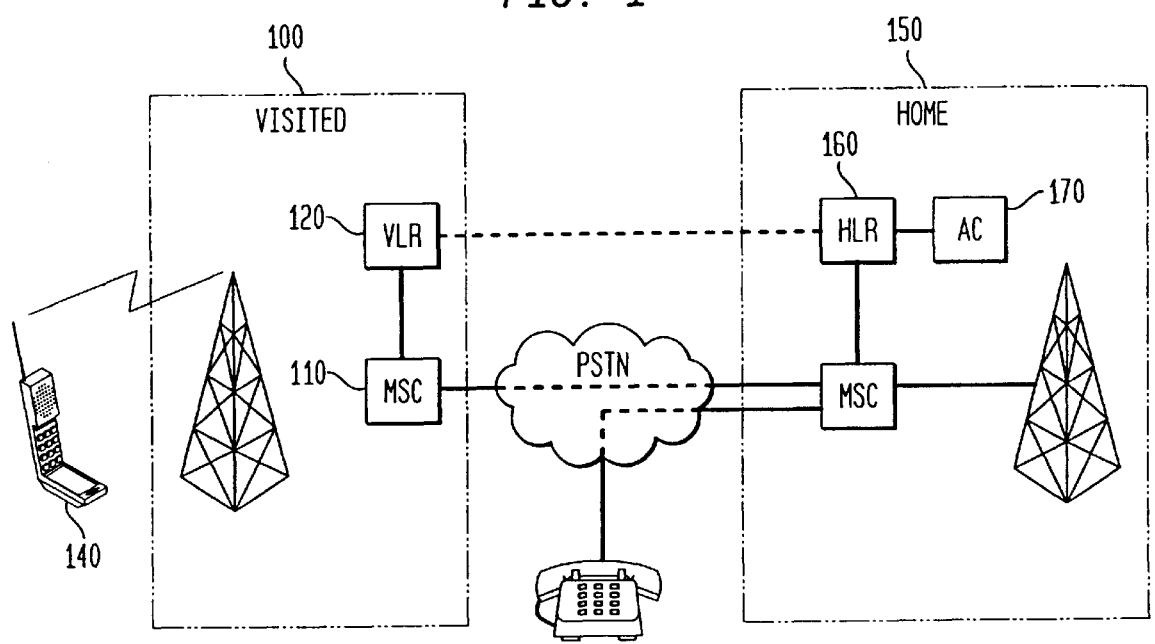
FIG. 1 represents a prior art typical infrastructure supporting call origination and call delivery.

While the present invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Wireless telephone users generally subscribe to a wireless service provider. The subscriber may use their mobile devices within the home wireless network served by their wireless service provider in exchange for subscription fees. However, users also may travel, and thus need to have their mobile devices operate outside of their home wireless networks as they visit other areas.

FIG. 1 shows a typical wireless infrastructure that provides cellular/PCS services like call origination and call delivery for a roaming mobile device 140. For call origination, the Visitors Location Register (VLR) 120 in the visited network 100 contacts the Home Location Register (HLR) 160 and Authentication Center (AC) 170 in the home network 150 for user registration and authentication (e.g., checking to see, among other things, if the user has made payments).

A Mobile Switching Center (MSC) 110 is a telephone switch specialized for wireless and mobility support. A MSC performs various functions, including mobility management, call handoffs, call admission, call control, resource allocation, and so forth.

Since the visited network and home network may be operated by different wireless operators, certain kinds of business roaming agreements are necessary for things like billing settlement. In GSM networks, a GSM Memorandum of Understanding (MoU) serves that purpose.

Table 1 summarizes the current cellular/PCS technologies and the network elements that are involved in call origination.

TABLE 1

| Cellular Value Proposition | Current Supporting Cellular/PCS Technologies |
| --- | --- |
| Wireless and mobility | Base stations, RF engineering, hard and soft handoffs |
| Wide Coverage Area | Automatic roaming across visited & home wireless networks using VLR/HLR/AC<br>• US: ANSI-41 and business roaming agreements<br>• GSM: GSM MAP and GSM Memorandum of Understandings |
| Reliable services of both<br>• voice/data call origination<br>• voice/data call delivery | Call origination: involves VLR, HLR, and AC for service qualification, user service profile, and billing.<br>Call delivery: involves VLR and HLR, Temporary Local Directory Number (TLDN) assignment, call forwarding/routing, and billing. |

A problem occurs when a GSM user, who roams to a CDMA or TDMA network, may not be provided with wireless services simply because there lacks a GSM Memorandum of Understandings (MoU) between the home GSM network and visited CDMA network for billing settlement. A similar problem occurs when a CDMA or TDMA user, who roams to a GSM network, may not be provided with wireless services simply because there is no agreement for billing settlement between the two networks. The problem may exist even when there is no technological barrier (e.g., the user's mobile device is capable of dual-mode operation), and when there is no billing barrier (e.g., the user has the ability to pay for wireless calls with his/her valid credit card).

The present invention supports call origination by integrating the following: use of the user's credit card as a payment method; and use of the Diffie-Hellman algorithm to encrypt the user's credit card information for over-the-air transmission.

Figure 2:
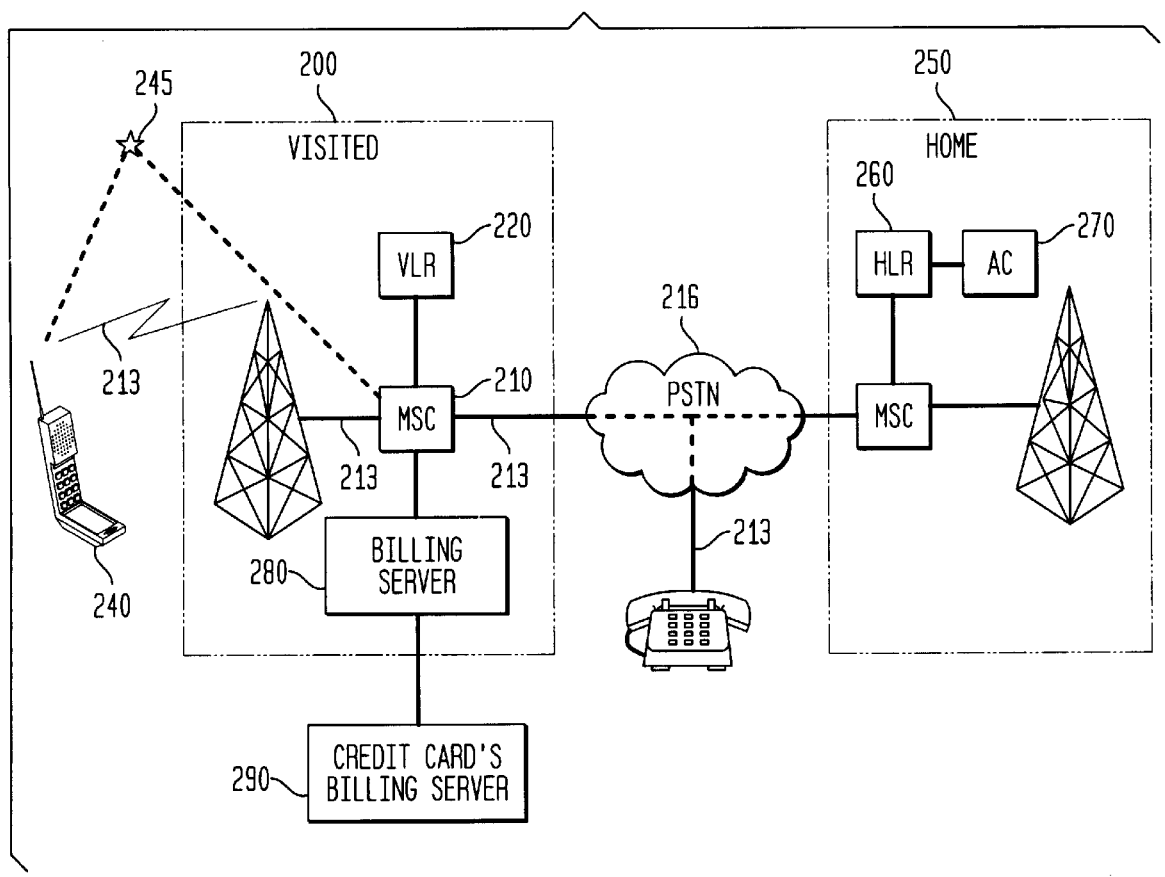
FIG. 2 represents the infrastructure supporting call origination in accordance with the present invention.

FIG. 2 shows an embodiment of the present invention in operation that supports call origination (i.e., outgoing calls) for a roaming user with mobile device 240 wherein the roamer's HLR 260 in the home network 250 is not contacted. The user's mobile device 240 and the visited network 200 interact with each other to establish a temporary shared secret 245 using the Diffie-Hellman algorithm. This technique is also used in Cellular Digital Packet Data (CDPD) networks typically used for low speed packet data services. The user's credit card information is transmitted from the mobile device 240 to the visited network 200 over the air using the established temporary shared secret. The shared secret 245 permits the sensitive information of the user's credit card information to be relayed to the visited network 200 securely.

The credit card information can be entered by the user on the phone keypad, or via a swipe of the card through a card reader slot on the phone, or via some other means. In one embodiment, the credit card information is optionally stored within the mobile device. In another embodiment, the credit card information must be entered by the user for each use. In another embodiment, the user selects a credit card number from a list to be used for the outgoing call. The credit card number used may belong to the user, the user's employer, or another third party. The credit card number thus relayed securely is then verified by the visited network's billing server to ensure it is valid, using methods familiar to anyone exposed to credit card payments and transactions and thus not detailed herein.

After credit card verification, the user's mobile-originated call 213 is processed and delivered to the called party via the visited MSC 210. The user's outgoing call is subsequently carried over traditional circuit-switched PSTN lines 216 between the wireless networks 200, 250. The use of the PSTN lines to carry a telephone call is well understood and not detailed herein.

When the user's outgoing call is terminated, billing information is collected in the serving network's billing server 280. The billing information may include but is not limited to at least one of the number called, the duration of the call, which credit card number was used, time and date, and other kinds of billing data. At the end of a billing period, or when the accumulated bill amount exceeds some predetermined amount, or when additional services or processing fees may be imposed, or at some other preferential time the visited network's billing server 280 interacts with the credit card's billing server 290 for billing settlement, using the traditional and well-understood practices for accounting for services rendered.

In accordance with the present invention, the roamer's HLR 260 and the roamer's Authentication Center (AC) 270 are not contacted for call origination.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system to provide basic wireless call origination service for a user having a mobile device and subscribing to a home wireless service provider serving a home wireless network, wherein the user roams to visit an area served by a visited wireless service provider serving a visited wireless network distinct and separate from the home wireless network, wherein there does not exist a pre-arranged understanding between the home wireless service provider and the visited wireless service provider for billing settlement, and wherein the user has independent payment means to pay for the basic wireless call origination service, the system comprising:

> origination service means for providing basic wireless call origination service via the visited wireless network by the visited wireless service provider;
>
> payment identification means for identifying the user's payment means to the visited wireless network;
>
> collection means for collecting billing information from the visited wireless network by the visited wireless service provider responsive to the origination service means; and
>
> billing means for billing the user by the visited wireless service provider responsive to the collection means and the payment identification means;
>
> wherein the user's payment means further comprises credit card information, and wherein the payment identification means for identifying the user's payment means to the visited wireless network further comprises:
>
>> payment shared secret means for establishing a Diffie-Hellman temporary shared secret between the user's mobile device and the visited wireless network;
>>
>> secure transmission means for securely transmitting the credit card information to the visited wireless service provider via the visited wireless network responsive to the payment shared secret means; and
>>
>> verification means for verifying the validity of the credit card information by the visited wireless network responsive to the secure transmission means.

2. The system as in claim 1, wherein the credit card information is stored within the user's mobile device.

3. The system as in claim 1, wherein the user's mobile device further comprises data entry means to enter the credit card information to the user's mobile device.

4. The system as in claim 3, wherein the data entry means comprises a keypad.

5. The system as in claim 3, wherein the data entry means comprises a card reader.

6. The system as in claim 1, wherein the basic wireless call origination service is delivered to the called destination via at least one of the visited wireless network and a Public Switched Telephony Network (PSTN) coupled to the visited wireless network.

7. The system as in claim 1, wherein the user's mobile device operates in exactly one mode of analog, Time Division Multiple Access (TDMA), Code Division Multiple Access (CDMA), Personal Communication Systems (PCS), and Global Systems for Mobile communications (GSM).

8. The system as in claim 1, wherein the user's mobile device operates in at least two of the modes of analog, Time Division Multiple Access (TDMA), Code Division Multiple Access (CDMA), Personal Communication Systems (PCS), and Global Systems for Mobile communications (GSM).

9. A method to bypass Global Systems for Mobile Communications (GSM) Memorandum of Understanding (MoU) to provide basic wireless call origination service for a user having a mobile device and subscribing to a home wireless service provider serving a home wireless network, wherein the user roams to visit an area served by a visited wireless service provider serving a visited wireless network distinct and separate from the home wireless network, wherein there does not exist a pre-arranged GSM MoU between the home wireless service provider and the visited wireless service provider, and wherein the user has a payment means to pay for the basic wireless call origination service, the method comprising:

> identifying the user's payment means to the visited wireless network;
>
> providing basic wireless call origination service via the visited wireless network by the visited wireless service provider;
>
> collecting billing information from the visited wireless network by the visited wireless service provider; and
>
> billing the user by the visited wireless service provider responsive to the billing information collected and the user's identified payment means;
>
> wherein the user's payment means comprises credit card information, and wherein the step of identifying the user's payment means to the visited wireless network further comprises:
>
>> establishing a Diffie-Hellman temporary shared secret between the user's mobile device and the visited wireless network;
>>
>> securely transmitting the credit card information to the visited wireless service provider via the visited wireless network using the temporary shared secret; and
>>
>> verifying the validity of the credit card information by the visited wireless network.

10. The method as in claim 9, wherein the step of securely transmitting the user's credit card information further comprises retrieving previously stored credit card information within the user's mobile device.

11. The method as in claim 9, wherein the step of securely transmitting the user's credit card information further comprises the user entering credit card information into the user's mobile device.

12. The method as in claim 9, wherein the basic wireless call origination service is delivered to the called destination via at least one of the visited wireless network and a Public Switched Telephony Network (PSTN) coupled to the visited wireless network.

13. The method as in claim 9, wherein the user's mobile device operates in exactly one mode of analog, Time Division Multiple Access (TDMA), Code Division Multiple Access (CDMA), Personal Communication Systems (PCS), and Global Systems for Mobile communications (GSM).

14. The method as in claim 9, wherein the user's mobile device operates in at least two of the modes of analog, Time Division Multiple Access (TDMA), Code Division Multiple Access (CDMA), Personal Communication Systems (PCS), and Global Systems for Mobile communications (GSM).

* * * * *